US006983832B2

(12) United States Patent
Namuduri et al.

(10) Patent No.: US 6,983,832 B2
(45) Date of Patent: Jan. 10, 2006

(54) IMPACT ENERGY ABSORBER AND PROCESS

(75) Inventors: Chandra Sekhar Namuduri, Troy, MI (US); Alan Lampe Browne, Grosse Pointe, MI (US); John C. Ulicny, Oxford, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/691,372

(22) Filed: Oct. 22, 2003

(65) Prior Publication Data

US 2005/0087410 A1 Apr. 28, 2005

(51) Int. Cl.
*F16F 9/53* (2006.01)
*F16F 7/12* (2006.01)
(52) U.S. Cl. .................................. 188/267.2; 188/372
(58) Field of Classification Search ................ 188/267, 188/267.1, 267.2, 371–377
See application file for complete search history.

(56) References Cited

U.S. PATENT DOCUMENTS

| 2,856,179 | A |   | 10/1958 | Hogan |
|---|---|---|---|---|
| 4,351,515 | A | * | 9/1982 | Yoshida .................... 188/267 |
| 4,673,067 | A |   | 6/1987 | Munning et al. |
| 4,679,775 | A | * | 7/1987 | Funaki et al. ............ 188/267.2 |
| 4,896,754 | A |   | 1/1990 | Carlson et al. .......... 188/267.1 |
| 4,925,409 | A |   | 5/1990 | Johnson |
| 4,938,322 | A |   | 7/1990 | Sugasawara ................ 188/290 |
| 4,942,947 | A | * | 7/1990 | Shtarkman ............... 188/267.2 |
| 5,018,606 | A |   | 5/1991 | Carlson ................... 188/267.1 |
| 5,099,884 | A |   | 3/1992 | Monahan |
| 5,366,048 | A | * | 11/1994 | Watanabe et al. ........ 188/267.1 |
| 5,492,312 | A | * | 2/1996 | Carlson .................... 188/267.2 |
| 5,525,249 | A | * | 6/1996 | Kordonsky et al. ....... 252/62.56 |
| 5,573,088 | A |   | 11/1996 | Daniels ...................... 188/267 |
| 5,900,184 | A |   | 5/1999 | Weiss et al. |
| 5,944,151 | A | * | 8/1999 | Jakobs et al. ............ 188/267.2 |
| 5,944,152 | A |   | 8/1999 | Lindsay et al. |
| 5,947,238 | A | * | 9/1999 | Jolly et al. ............... 188/267.2 |
| 5,992,582 | A |   | 11/1999 | Lou et al. ................ 188/267.1 |
| 6,095,486 | A |   | 8/2000 | Ivers et al. |
| 6,202,806 | B1 |   | 3/2001 | Sandrin et al. .......... 188/267.2 |
| 6,260,675 | B1 |   | 7/2001 | Muhlenkamp .............. 188/267 |
| 6,279,700 | B1 |   | 8/2001 | Lisenker et al. ......... 188/267.1 |
| 6,279,701 | B1 |   | 8/2001 | Namuduri et al. ....... 188/267.1 |
| 6,302,249 | B1 | * | 10/2001 | Jolly et al. ................. 188/269 |
| 6,327,024 | B1 | * | 12/2001 | Hayashi et al. ............. 188/267 |

(Continued)

FOREIGN PATENT DOCUMENTS

GB 2384217 7/2003

OTHER PUBLICATIONS

W.P. Jones, "Investigation of Magnetic Mixtures for Clutch Application," AIEE Trans., 72(1953), pp. 88-92.

*Primary Examiner*—Thomas Williams
(74) *Attorney, Agent, or Firm*—Kathryn A. Marra

(57) ABSTRACT

A tunable and reusable impact energy absorbing system and process includes a control structure comprising a sleeve having an outer surface fixedly attached to a chassis, a seal at each end of the sleeve, a magnetorheological fluid disposed between the seals, and a coil in proximity to the magnetorheological fluid, wherein the seal and the magnetorheological fluid are in sliding engagement with a support member, wherein the impact surface is fixedly attached to a support member. Varying the current to the coil alters the magnetic field upon the magnetorheological fluid, which can be used to tune the yield stress of the sliding engagement.

18 Claims, 2 Drawing Sheets

U.S. PATENT DOCUMENTS

| | | |
|---|---|---|
| 6,390,253 B1 * | 5/2002 | Oliver ..................... 188/267.2 |
| 6,394,239 B1 | 5/2002 | Carlson ................... 188/267.2 |
| 6,427,813 B1 * | 8/2002 | Carlson ................... 188/267.2 |
| 6,471,018 B1 | 10/2002 | Gordaninejad et al. |
| 6,571,161 B2 | 5/2003 | Browne et al. |
| 6,601,915 B2 | 8/2003 | Sullivan et al. .......... 297/216.1 |
| 6,681,905 B2 * | 1/2004 | Edmondson et al. .... 188/267.2 |
| 6,836,717 B2 | 12/2004 | Buechele et al. |
| 2002/0113424 A1 | 8/2002 | Smith, Jr. et al. |
| 2002/0185347 A1 * | 12/2002 | Pohl et al. ................ 188/267.2 |
| 2003/0001372 A1 | 1/2003 | Browne et al. |
| 2003/0113160 A1 | 6/2003 | Welch et al. |
| 2004/0173422 A1 | 9/2004 | Deshmukh et al. ....... 188/267.2 |
| 2004/0182661 A1 | 9/2004 | Lun ........................ 188/267.2 |

* cited by examiner

IMPACT ENERGY ABSORBER AND PROCESS

BACKGROUND

This disclosure generally relates to an impact energy absorber and more particularly, to an impact energy absorber employing a magnetorheological fluid for selectively controlling a stroking force of the absorber.

Current impact energy absorbers generally have a fixed response and are not tunable. For example, some impact energy absorbers rely base their energy absorption on the crash (plastic deformation) of a honeycomb-like structure, whose response is fixed and non-tunable for each form of such material. However, these types of impact energy absorbers provide a one time response, are expensive to replace, and are not tunable. Those impact energy absorber systems that are tunable generally rely on hydraulics, which are relatively bulky and expensive.

For an example of a prior art impact energy absorber, U.S. Patent Publication No. 20030113160A2 filed on Dec. 19, 2001 describes a highway crash attenuator frame that includes one or more tension elements secured between opposed side elements near the respective central hinges. Each tension element extends across the longitudinal axis of the frame, from one side of the frame to the other side of the frame. Each tension element includes a mechanical fuse that fails in tension when the first and second side elements of the frame apply an excessive load to the tension element. Once the mechanical fuse fails, central hinges on both sides of the frame are simultaneously allowed to begin opening. In this way, the collapse of the frame is coordinated between the left and right sides of the frame. However, the use of a fuse is a one-time event, requiring expensive replacement.

Magnetorheological (MR) fluids belong to a class of controllable fluids. The essential characteristic of these fluids is their ability to reversibly change from a free-flowing, linear, viscous liquid to a semi-solid with controllable yield strength in milliseconds when exposed to a magnetic field. In the absence of an applied field, MR fluids are reasonably well approximated as Newtonian liquids.

A typical MR fluid has about 20 to about 40 percent by volume of relatively pure, soft iron particles, and a diameter of about 3 to about 5 microns suspended in a carrier liquid such as mineral oil, synthetic oil, water, or glycol. A variety of proprietary additives similar to those found in commercial lubricants are commonly added to discourage gravitational settling and promote particle suspension, enhance lubricity, modify viscosity, and inhibit wear. The ultimate strength of the MR fluid depends on the square of the saturation magnetization of the suspended particles.

MR fluids made from iron particles typically exhibit maximum yield strengths of 30 to 90 kPa for applied magnetic fields of 150 to 250 kA/m (1 Oe . 80 A/m). MR fluids are not highly sensitive to moisture or other contaminants that might be encountered during manufacture and use. Furthermore, because the magnetic polarization mechanism is not affected by the surface chemistry of surfactants and additives, it is a relatively straightforward matter to stabilize MR fluids against particle-liquid separation in spite of the large density mismatch.

It is very desirable to have the ability to provide different responses based upon sensor input, such as, for example, a variable response based on vehicle speed and nature of the impacting object, so as to meet the differing energy absorption and stroking force requirements of different impact scenarios. Accordingly, there remains a need for a tunable energy impact absorbers that are inexpensive, easy to repair or replace, and can be used multiple times.

BRIEF SUMMARY

Disclosed herein is an impact energy absorbing system comprising a control structure comprising a sleeve, a seal at each end of the sleeve, a magnetorheological fluid disposed between the seals, and a coil in proximity to the magnetorheological fluid; and a primary impact surface fixedly attached to a support member, wherein the support member is sliding engagement with the seal and the magnetorheological fluid of the control structure.

In another embodiment, the impact energy absorbing system comprising a control structure comprising a sleeve, a seal at each end of the sleeve, a magnetorheological fluid, and a permanent magnet in proximity to the magnetorheological fluid to define a fixed yield stress; and an impact surface fixedly attached to a support member, wherein the support member is slidably disposed against the seal and the magnetorheological fluid.

A process for absorbing energy from an impact of an object upon an impact surface comprises detecting an impact with a sensor, wherein the sensor is in operative communication with an impact energy absorbing system fixedly attached to the impact surface and a vehicle chassis, wherein the impact surface is attached to a support member in sliding engagement with the impact energy absorbing system; variably changing a magnetic field within the impact energy absorbing system to alter the shear force of the sliding engagement in response to a signal provided by the sensor; and absorbing energy from the impact with the impact energy absorbing system or the impact energy absorbing system and the vehicle chassis.

An impact energy absorber device comprises a primary impact surface fixedly attached to a shaft, wherein the shaft is slidably engaged with a housing; a plurality of plates disposed in the housing, wherein each plate is substantially parallel to an adjacent plate, and wherein the plurality of plates are alternating attached to the shaft and a framing member of the housing to define a space between adjacent plates; a magnetorheological fluid disposed in the space; and an electromagnet or permanent magnet in proximity to the magnetorheological fluid.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
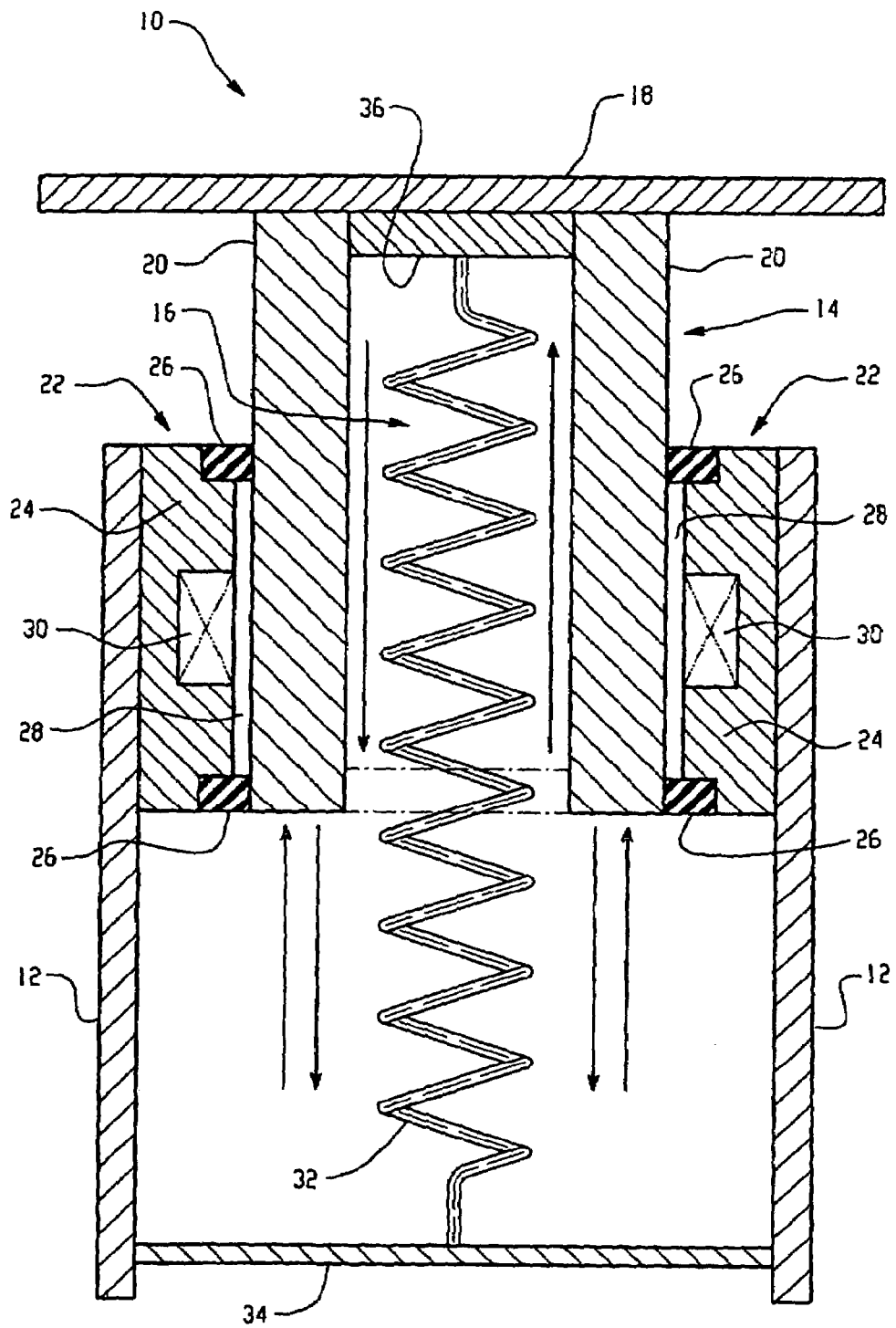
FIG. 1 is a cross sectional view of impact energy absorber.
Figure 2:
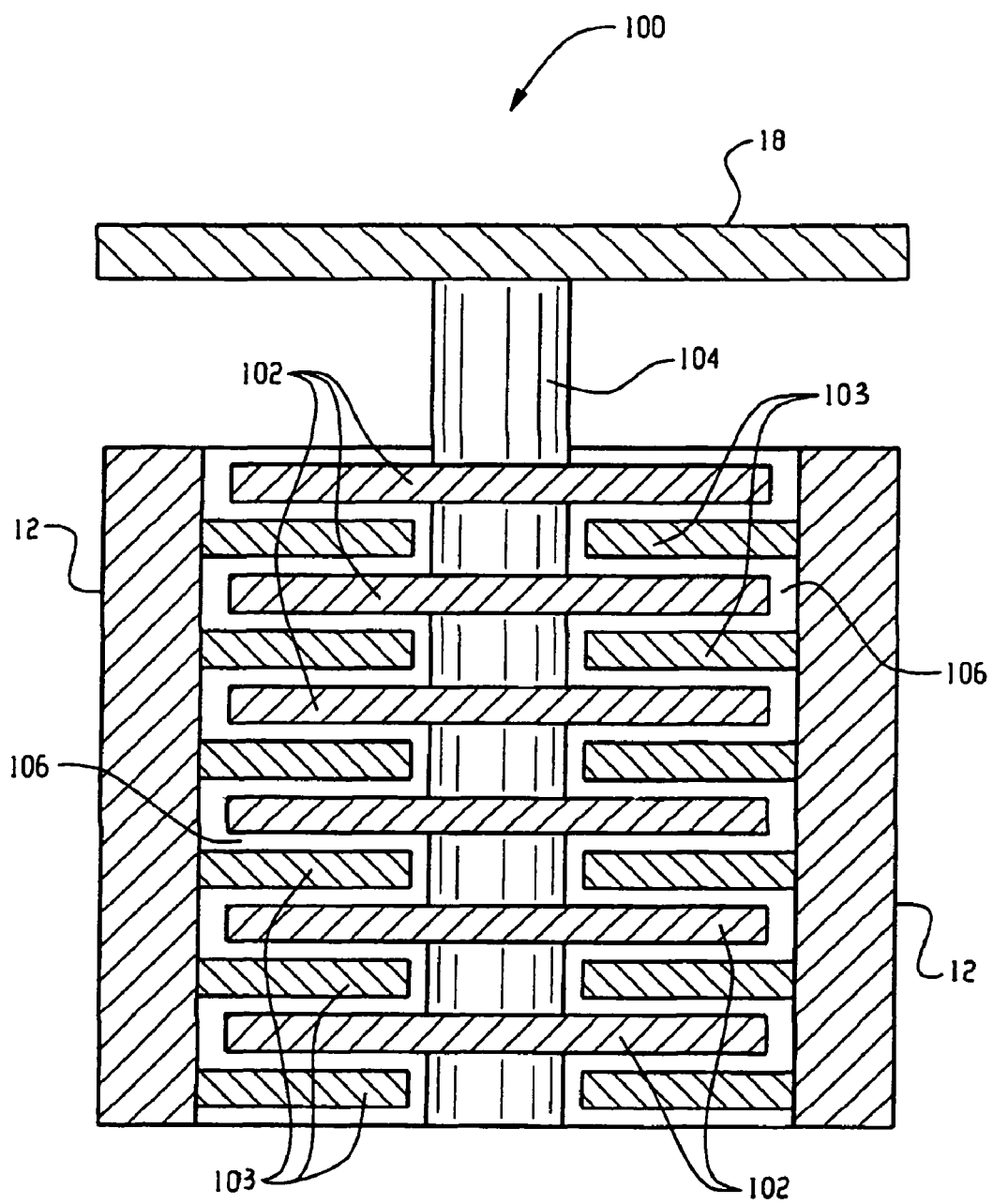
FIG. 2 is a cross sectional view of an impact energy absorber in accordance with another embodiment.

Disclosed herein is a tunable impact energy absorber containing a magnetorheological fluid for selectively controlling yield stress between moving surfaces. The impact energy absorber is configured to dissipate energy through the shear of an MR material in contact with portions of an MR device that experience relative motion during an impact event or the like. FIGS. 1 and 2 illustrate an exemplary impact energy absorber generally designated by reference numeral 10, that incorporates a magnetorheological fluid to selectively control the yield stress.

The impact energy absorber 10 includes a pair of stationary framing members 12, a first impact energy-absorbing assembly 14, and an optional second impact energy absorbing assembly 16. Stationary framing members 12 can be rails of a vehicle chassis such as may be desirable for providing a tunable impact energy absorber assembly for a front or rear vehicle bumper system, or can be attached to a stationary object as part of an energy absorber system for the object, or the like. The framing members 12 are not intended to be limited to any particular application and are suitable for use in any application desiring a tunable and reusable impact energy control.

The first impact energy absorbing assembly 14 comprises a movable impact surface 18 supported by support member 20, wherein a magnetorheological fluid controls movement. Although the cross sectional view illustrates two support members 20, the support member 20 is preferably cylindrical shaped and formed of a unitary member. Support member 20 is preferably formed from a soft magnetic material. Soft magnetic materials are defined as those materials that exhibit magnetic properties only when they are subject to a magnetizing force such as a magnetic field created when a current is passed through a wire surrounding a soft magnetic core. Soft magnetic materials are generally comprised of iron such as for example various steels, iron nickel alloys, and the like. High permeability, small coercitivity, and saturation under high magnetic field generally characterize their magnetic behavior. However, the specific magnetic characteristics vary considerably depending of their composition and their fabrication processing. The soft magnetic material structure can be either non-oriented (isotropic behavior) or oriented (anisotropic behavior).

The first impact energy surface structure 14 absorbs energy by slidably engaging framing members 12 during an impact event via control structure 22 fixedly attached to the framing members 12. The control structure 22 comprises a cylindrical sleeve 24 having an annular opening dimensioned to accommodate an outer diameter of the support members 20 of the first impact energy surface structure 14. The cylindrical sleeve 24 is fixedly attached to the frame members 12. Annular seals 26 are disposed at each end of the control structure 22 and abut an outer diameter of support member 20. The annular seals 26 enclose a magnetorheological fluid 28 that the support member 20 is slidably engaged therewith. Seals 26 also function as bearings during operation of the impact energy absorber 10. A coil 30 is centrally disposed within the cylindrical sleeve 24 in close proximity to the magnetorheological fluid 28.

The second impact energy absorbing assembly 16 includes a spring 32 fixedly attached at one end to transverse member 34, wherein the transverse member 34 is fixedly attached at each end to framing members 12. At the other end of the spring 32, there is a secondary impact surface 36, which is preferably a disk dimensioned to fit within a cylindrically shaped recess defined by support member 20. Upon an impact event, the secondary impact surface 36 is displaced as the spring 32 is compressed as a result of the impact event. Relaxation of spring 32 returns the secondary impact surface to its original position. Also, depending on whether a magnetic field is applied to the magnetorheological fluid 28 via coil 30, relaxation of the spring 32 will cause the first impact surface 18 to return to its original position.

Suitable MR fluid materials 28, 106 include, but are not intended to be limited to, ferromagnetic or paramagnetic particles or particulates dispersed in a carrier fluid. Suitable paramagnetic particles or particulates include compounds comprising oxides, chlorides, sulfates, sulfides, hydrates, and other organic or inorganic compounds of cerium, chromium, cobalt, dysprosium, erbium, europium, gadolinium, holmium, iron, manganese, neodymium, nickel, praesodymium, samarium, terbium, titanium, uranium, vanadium, and yttrium. Preferred particulates include alloys of iron, nickel, manganese, and cobalt, with or without other non-magnetic elements; alloys of iron, nickel, manganese, and cobalt with gadolinium; and the like, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron. In a preferred embodiment, the magnetorheological fluid includes a mixture of carbonyl iron and zinc oxide, silicon dioxide, molybdenum sulfide, or boron nitride, or a combination comprising at least one of the foregoing inorganic materials with the carbonyl iron.

The particle size should be selected so that the particles exhibit multi-domain characteristics when subjected to the magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometer especially preferred. The particles are preferably present in an amount of about 5 to about 75 percent by volume of the total composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component is preferably less than or equal to about 100,000 centipoise, with less than or equal to about 10,000 centipoise more preferred, and less than or equal to about 1,000 centipoise even more preferred. Also preferred is a viscosity of greater than or equal to about 1 centipoise, with greater than or equal to about 250 centipoise more preferred, and greater than or equal to about 500 centipoise especially preferred.

Aqueous carrier fluids may also be used, especially those comprising hydrophilic mineral clays such as bentonite and hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tristearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

The preferred particulates are nanoparticles. Suitable diameter sizes for the particulates can be less than or equal to about 500 nanometers, with less than or equal to about 250 nanometers preferred, and less than or equal to about 100 nanometers more preferred. Also preferred is a particulate diameter of greater than or equal to about 1.0 nanometer, with greater than or equal to about 10 nanometers more preferred, and greater than or equal to about 50 nanometers especially preferred. The particulates preferably have an aspect ratio of about 0.25 to about 4, where the aspect ratio is defined as the ratio of the length to the equivalent circular diameter. The particulates are preferably present in an amount between about 5 to about 50 percent by volume of the total MR composition. Alternatively, the particles can be larger, e.g., micron sized particles, to be effective in altering the modulus properties of the material in a magnetic field. However, the nanometer-sized particles are more preferred because the modulus properties can be more readily tailored by the choice of particle size, particle size distribution and particle concentration when the nanometer-sized particles are used.

Suitable magnetic field strengths generated by coil 30 or alternative a permanent magnet may range from greater than about 0 to about 1 Tesla (T).

During operation, when an impending impact and its severity are detected by a sensor (not shown), the coil 30 is energized to an appropriate predetermined current level prior to the actual impact by a control device. The control device may comprise a pulse width modulated current source AC or DC currents but is not limited to such. When impact at surface 18 occurs, the support member 20 is subjected to an opposing shear force due to the effect of the magnetic field generated by the current on the magnetorheological fluid 28. The energy absorbed is preferably equal to the product of the shear force due to the magnetorheological fluid effect and the displacement of the impact surface.

During the impact event, the spring 32 is compressed, thereby storing energy, which can then be used to restore the impact surface to its original position such as after an impact of relatively low magnitude. As such, the impact energy absorber 10 can be reusable for applications such as front and rear bumper systems for automotive vehicles, and the like, which normally require labor intensive servicing to replace the damaged bumpers or crash boxes even in case of minor impacts, i.e., fender benders. In the case of a more severe crash, the support member 20 bottoms out on transverse member 34 and the impact energy can be absorbed by the vehicle structure.

Although reference is made to one sensor, it is contemplated that one or more sensors could be utilized. The sensors may include, but are not intended to be limited to, precrash sensors, e.g., radar, ultrasonic, and telecommunication based sensors including vehicle-to-vehicle types such as described in U.S. Pat. No. 6,571,161, vehicle to environment, satellite based vehicle locators. The sensors are in operative communication with controllers and control logic so as to establish the magnitude of magnetic field required for each particular impact scenario.

In an alternative embodiment as shown in FIG. 2, the impact energy absorber 100 includes the use of multiple layered plates 102 mounted about a shaft 104, wherein each plate is parallel to an adjacent plate. Alternating plates are fixedly attached to the framing member 103 (i.e., stator) and the shaft. A space between the plates is filled with a magnetorheological fluid 106, which can be variably controlled to adjust compressive yield stress in the manner previously described. A coil 30 or multiple coils are disposed about the shaft 104 in close proximity to the magnetorheological fluid 106 to provide a magnetic field. Optionally, one or more plates can be a permanent magnet to provide a fixed yield stress.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An impact energy absorbing system comprising:
   a control structure fixedly attached to a vehicle chassis comprising a sleeve, a seal at each end of the sleeve, a magnetorheological fluid disposed between the seals, and at least one coil in proximity to the magnetorheological fluid;
   a primary impact surface fixedly attached to a support member, wherein the support member comprises an annular surface in sliding engagement with the seal and the magnetorheological fluid of the control structure, wherein the magnetorheological fluid contacts the support member only at the annular surface; and
   a secondary impact surface comprising a disc disposed within an annular recess of the support member, wherein the annular recess comprises a spring having one end fixedly attached to a transverse member and an other end fixedly attached to the secondary impact surface, wherein the transverse member is fixedly attached to the vehicle chassis, and wherein the secondary impact surface is in direct contact with a portion of the primary impact surface when the impact energy absorbing system is at rest.

2. The impact energy absorbing system of claim 1, wherein the support member is formed of a soft magnetic material.

3. The impact energy absorbing system of claim 1, wherein the magnetorheological fluid comprises carbonyl iron and an inorganic material selected from the group consisting of zinc oxide, silicon dioxide, molybdenum sulfide, and boron nitride.

4. The impact energy absorbing system of claim 1, wherein the magnetorheological fluid comprises ferromagnetic or paramagnetic particles or particulates dispersed in a carrier fluid.

5. The impact energy absorbing system of claim 4, wherein the particles are in an amount of about 5 to about 75 percent by volume of the magnetorheological fluid.

6. The impact energy absorbing system of claim 1, further comprising a permanent magnet in proximity to the magnetorheological fluid.

7. An impact energy absorbing system comprising:
a control structure fixedly attached to a vehicle chassis comprising a sleeve, a seal at each end of the sleeve, a magnetorheological fluid, and a permanent magnet in proximity to the magnetorheological fluid to define a fixed yield stress; and
a primary impact surface fixedly attached to a support member, wherein the support member comprises an annular surface slidably disposed against the seal and the magnetorheological fluid, wherein the magnetorheological fluid contacts the support member only at the annular surface; and
a secondary impact surface comprising a disc disposed within an annular recess of the support member, wherein the annular recess comprises a spring having one end fixedly attached to a transverse member and an other end fixedly attached to the secondary impact surface, wherein the transverse member is fixedly attached to the vehicle chassis, and wherein the secondary impact surface is in direct contact with a portion of the primary impact surface when the impact energy absorbing system is at rest.

8. The impact energy absorbing system of claim 7, wherein the support member is formed of a soft magnetic material.

9. The impact energy absorbing system of claim 7, wherein the magnetorheological fluid comprises carbonyl iron and an inorganic material selected from the group consisting of zinc oxide, silicon dioxide, molybdenum sulfide, and boron nitride.

10. The impact energy absorbing system of claim 7, wherein the magnetorheological fluid comprises ferromagnetic or paramagnetic particles or particulates dispersed in a carrier fluid.

11. The impact energy absorbing system of claim 10, wherein the particles are in an amount of about 5 to about 75 percent by volume of the magnetorheological fluid.

12. The impact energy absorbing system of claim 10, wherein the permanent magnet in proximity to the magnetorheological fluid is at a distance effective to impart a magnetic field on the magnetorheological fluid.

13. The impact energy absorbing system of claim 7, further comprising an electromagnet in proximity to the magnetorheological fluid.

14. A process for absorbing energy from an impact of an object upon an impact surface, the process comprising:
detecting an impact with a sensor, wherein the sensor is in operative communication with an impact energy absorbing system fixedly attached to the impact surface ends vehicle chassis, wherein the impact surface is attached to a support member in sliding engagement with the impact energy absorbing system and wherein a magnetorheological fluid contacts the support member only at an annular surface;
variably changing a magnetic field within the impact energy absorbing system to alter a shear force of the sliding engagement in response to a signal provided by the sensor;
absorbing energy from the impact with the impact energy absorbing system or the impact energy absorbing system and the vehicle chassis; and
restoring the impact surface to its original position with a spring having one end fixedly attached to a transverse member attached to the vehicle chassis and an other end fixedly attached to a secondary impact surface, wherein the secondary impact surface is disposed within an annular recess of the support member and is displaced as the spring compresses upon the impact and returns to its original position wherein it is in direct contact with a portion of the impact surface upon expansion of the spring after the impact.

15. The process according to claim 14, wherein variably changing the magnetic field comprises changing a yield strength of a magnetorheological fluid in fluid contact with the support member.

16. The process according to claim 15, wherein the magnetorheological fluid comprises carbonyl iron and an inorganic material selected from the group consisting of zinc oxide, silicon dioxide, molybdenum sulfide, and boron nitride.

17. The process according to claim 14, wherein variably changing the magnetic field comprises changing a current to a coil in proximity to the magnetorheological fluid.

18. The process of claim 14, wherein the impact energy absorbing system can be used multiple times.

* * * * *